June 16, 1931.  F. J. TAYLOR  1,809,876
MAP FOLDER
Filed Nov. 28, 1927
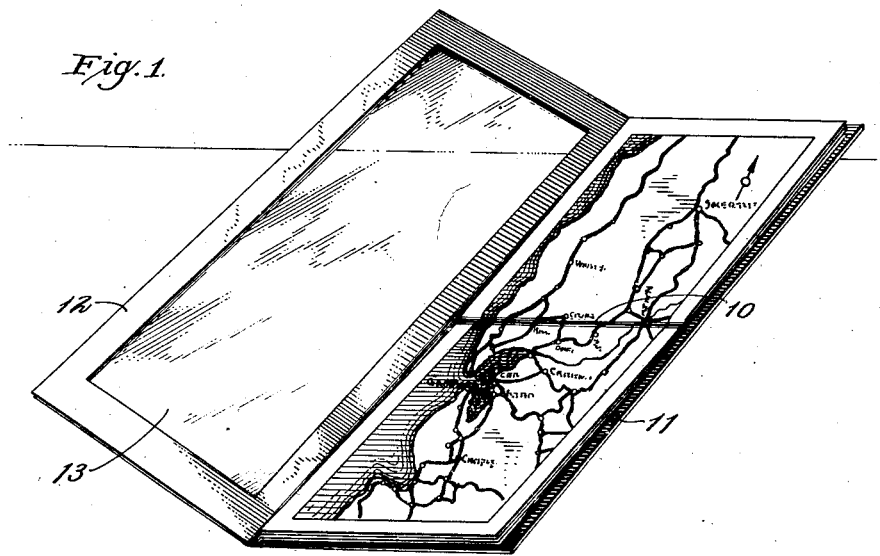
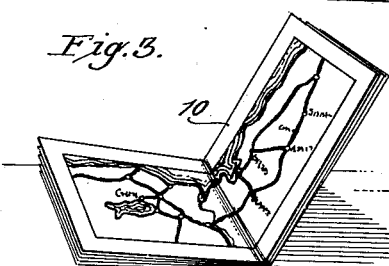
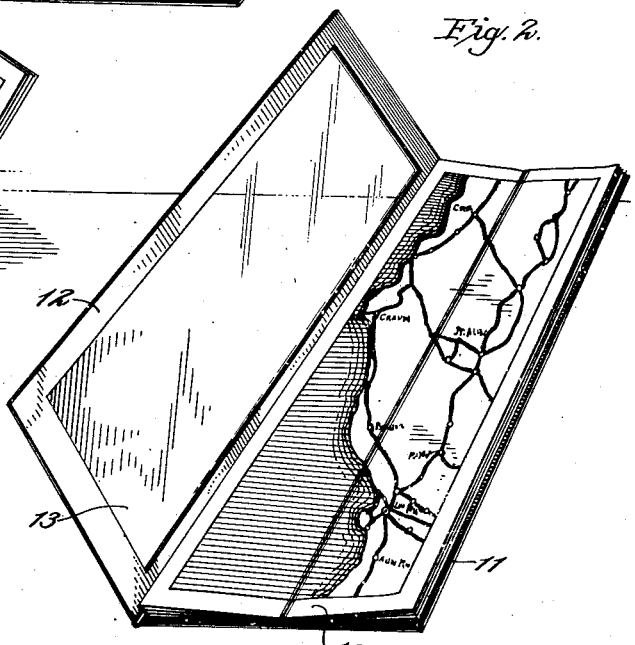
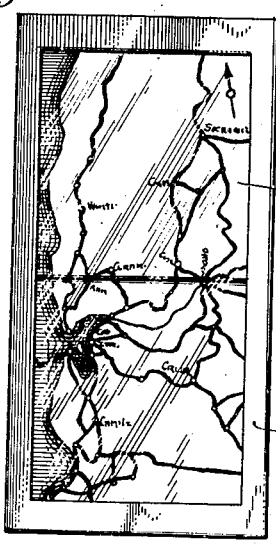
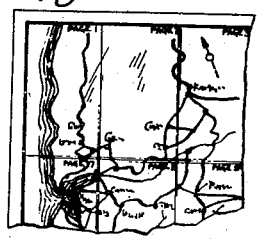
INVENTOR.
Frank J. Taylor
BY
ATTORNEYS.

Patented June 16, 1931

1,809,876

UNITED STATES PATENT OFFICE

FRANK J. TAYLOR, OF SAN FRANCISCO, CALIFORNIA

MAP FOLDER

Application filed November 28, 1927. Serial No. 236,132.

My present invention relates to a novel form of map mounting and holder therefor.

An object of my invention is to provide a novel form of map folder which will be compact, convenient, and require a minimum of space.

Another object of my invention is to provide a method of securing a map, comprising a plurality of pages, to a folder whereby the same may be opened up to expose various portions thereof by opening the folder at the desired point.

A further object of my invention is to provide a folder for maps of the above type which will protect the same when open as in use, and at the same time permit the desired map to be observed through the protective covering.

In the use of maps it is desirable that they be conveniently arranged so that they can be readily referred to, and it is also desirable that the map be of such character that its life will not be impaired by exposure. It is also desirable that the map be small and compact, so as to be convenient in use.

In the use of large maps it is customary to fold them in various ways so as to expose the particular portion of zone corresponding to the territory being traveled, and envelopes having a transparent covering into which this folded map can be inserted have been in use. The tendency at the present time, however, is to get away from large maps by providing what are known as "strip maps" which cover particular routes and are of such a scale as to constitute a valuable guide for tourists. These "strip maps", however, are printed separately upon small cards and can very easily become lost or misplaced, and the applicant has therefore conceived the idea of providing a map having the various sections thereof arranged upon opposite pages of a small booklet, so that as the pages are turned a complete section of map will be exposed across the surface of the open booklet, and adjacent to one edge of the booklet of maps he has provided a flap, or cover portion, which when closed will protect the maps from injury and maintain the map booklet open at the desired point. This cover portion in one modification is also provided with a transparent material through which the exposed map may be viewed.

For a better understanding of my invention, reference should be had to the accompanying drawings, in which—

Fig. 1 is a perspective view of a map booklet constructed in accordance with one form of my invention, Fig. 2 shows another form of a map booklet constructed in accordance with my invention.

Fig. 3 shows another form of a map booklet in accordance with my invention.

Fig. 4 shows the map booklet of Fig. 1 in its closed or usable position.

Fig. 5 shows a fractional view of a corner of my booklet open to the index map.

In these drawings, I have designated the map booklet by the numeral 10. The booklet 10 is secured to the back cover 11 of a folder structure having a front cover portion 12 which is adapted to be folded over the leaves of the booklet 10, so as to protect the same. The cover portion of 12 is provided with a transparent window 13 through which the exposed map of the booklet 10 may be viewed. The pages of the booklet 10 are printed so that the exposed sides of opposite pages will present to view a complete map, one-half of which will appear on each side of the binding line. By so arranging the maps in the booklet 10, it will be seen that I have provided a composite arrangement wherein a plurality of map sections can be secured together so as not to require any more space than would be required by a single map, and which can be opened to expose any desired map section without disarranging their prearranged sequence, and at the same time present to view as desired map sections of a uniform size. It will also be seen that by the provision of the cover portions 11 and 12, a very compact and convenient container is provided which will protect the maps and not interfere with the owner or inconvenience him in referring thereto.

In Fig. 2 of the drawings, I have shown the leaves of the booklet 10 as bound along the vertical center line of the cover portion 11. This modification is also provided with a cover portion 12 having a transparent section 13, and its operation is substantially the same as in the case of the booklet shown in Fig. 1.

In Fig. 3, my improved booklet is shown without a transparent cover portion 12 and its transparent window 13. In this case, the cover portion 11 is adapted to be folded along its center line so as to thereby permit the booklet 10 to be closed so as to protect the maps bound therein. Upon inspection of this figure of the drawings, it will be seen that the map section is printed across the two adjacent pages so that as each page is turned over a new map section, which extends completely across the booklet, will be exposed to view.

Another advantage of this form of booklet is that it can be folded so as to require only one-half the space required by the booklet shown in the Fig. 1, and as a result it can be more conveniently carried.

As previously stated, in preparing a booklet in accordance with my invention, a relatively large map is divided into sections and each of these sections is so printed upon the opposite sides of the booklet pages that irrespective of where the booklet is opened a complete section of the larger map will be exposed to view. In order that the pages showing the various sections of the map may be conveniently located, I provide an index map of the entire territory covered by the several enlarged maps in the booklet. A portion of this index map is illustrated in Fig. 5 which shows the map divided into sections by vertical and horizontal lines forming enclosures in each of which a page number is shown to indicate the page upon which the enlarged map of that section may be found.

In Fig. 4 the booklet illustrated in Fig. 1 is shown with the cover portion 12 folded over the map section so as to protect the same. It will also be seen that the transparent portion 13 of such size that it corresponds to the outline of the map section so that the complete map will be visible therethrough.

When my improved folder is in use, the user, if the booklet contains maps, will turn to the index map and, after locating the section through which he is to travel, will open the booklet to the proper page, where an enlarged detail map will be presented to view. If the folder is provided with a transparent cover he can then close the cover and view the map without exposing it to the weather or otherwise subjecting it to wear. This form of folder also has advantages, even in the absence of a transparent window, because the cover can be used as a protective means for the maps when not in use, and when in its closed position it will retain the map booklet open at the proper place, so that once a map section is turned to, it will remain so, and the user will only have to open the folder cover as he subsequently refers to the map, without having to again find the correct page.

From the above it will be seen that I have produced a novel and complete map folder which will be convenient and durable in use, and one which will be particularly valuable to automobile tourists; and while I have shown above various modifications of my invention as now known to me, I desire to have it understood that the above description and the accompanying drawings are only by way of illustration, and that various modifications and applications may be made without departing from the spirit of my invention as defined in the following claims:

Having thus described my invention, what I claim and desire to secure by Letters Patent is—

1. A map folder comprising a plurality of pages secured together in booklet form, having map data printed on each side thereof, and arranged so that a complete map, extending across said booklet, will be exposed to view when said booklet is opened, and a folder for said booklet having a cover hinged at right angles to said booklet binding, so that it can fold over said booklet in its open position and thereby protect the booklet and retain it open for ready reference, said cover having a cut out portion through which the map may be observed.

2. A map folder comprising a plurality of pages secured together in booklet form, having map data printed on each side thereof, and arranged so that a complete map, extending across said booklet, will be exposed to view when said booklet is opened and a folder for said booklet having a front and back cover, said booklet being secured along a center line of said back cover, and said front cover of said folder being hinged to one side of said back cover, whereby it may be folded to enclose said booklet in an open position, and having a cut out portion through which the map may be observed.

3. A booklet comprising a back cover, a plurality of pages forming the booklet hinged along a central line of said back cover, a front cover hinged to said back to one side of said pages and adapted to fold over and protect said pages when the latter are open at a particular place, whereby the booklet will be protected while the open place therein is retained, and a cut out portion in said front cover through which the open pages may be observed.

4. A booklet comprising a back cover, a plurality of pages hinged along a center line of said back cover, and a front cover having a portion of transparent material, hinged to said back and adapted to fold completely over said booklet when open, to thereby protect the same and permit said booklet to be viewed therethrough.

5. A booklet comprising a back cover, a page folded along its center line and hinged to said back cover, and a front cover hinged to said back and adapted to fold completely over said booklet when open, to protect the same and hold the folded page open, said front cover having a cut out portion through which the page may be observed.

FRANK J. TAYLOR.